United States Patent
Armangau et al.

(10) Patent No.: US 9,841,901 B1
(45) Date of Patent: Dec. 12, 2017

(54) TECHNIQUES FOR CREATING WINDOWS OF FREE BLOCKS IN A FILE SYSTEM IN ACCORDANCE WITH TRIGGER CONDITIONS, SLICE SELECTION CRITERIA AND TERMINATION CRITERIA

(71) Applicant: EMC IP Holding Company LLC, Hopkinton, MA (US)

(72) Inventors: Philippe Armangau, Acton, MA (US); Ahsan Rashid, Edison, NJ (US); Kumari Bijayalaxmi Nanda, Edison, NJ (US); Rohit K. Chawla, Scotch Plains, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 14/985,706

(22) Filed: Dec. 31, 2015

(51) Int. Cl.
  *G06F 13/00* (2006.01)
  *G06F 3/06* (2006.01)
  *G06F 17/30* (2006.01)

(52) U.S. Cl.
  CPC .......... *G06F 3/0604* (2013.01); *G06F 3/0644* (2013.01); *G06F 3/0665* (2013.01); *G06F 3/0673* (2013.01); *G06F 17/30138* (2013.01)

(58) Field of Classification Search
  CPC .............. G06F 3/0604; G06F 17/30138; G06F 3/0673; G06F 3/0644; G06F 3/0689; G06F 3/0665; G06F 3/0631; G06F 3/067
  USPC ......... 711/170, 154; 707/609, 821, 823, 828
  See application file for complete search history.

(56) References Cited

U.S. PATENT DOCUMENTS

| | | | |
|---|---|---|---|
| 7,949,637 B1 | 5/2011 | Burke | |
| 8,566,371 B1 * | 10/2013 | Bono | G06F 17/30079 707/822 |
| 8,924,681 B1 * | 12/2014 | Throop | G06F 3/0631 711/114 |
| 9,256,381 B1 * | 2/2016 | Fultz | G06F 3/0611 |
| 9,298,555 B1 * | 3/2016 | Ai | G06F 11/1435 |
| 9,395,937 B1 * | 7/2016 | Si | G06F 3/0689 |
| 9,535,630 B1 * | 1/2017 | Bono | G06F 3/0689 |
| 9,619,169 B1 * | 4/2017 | Throop | G06F 3/0647 |
| 2009/0070541 A1 * | 3/2009 | Yochai | G06F 3/0605 711/165 |
| 2009/0249022 A1 * | 10/2009 | Rowe | G06F 12/023 711/206 |
| 2015/0199147 A1 * | 7/2015 | Goldberg | G06F 3/0644 711/170 |
| 2016/0371022 A1 * | 12/2016 | Dausner | G06F 3/0608 |

* cited by examiner

*Primary Examiner* — Hong Kim
(74) *Attorney, Agent, or Firm* — Muirhead and Saturnelli, LLC

(57) ABSTRACT

Described are techniques for creating windows of free blocks in a file system selected in accordance with trigger conditions. A first slice is selected, in accordance with slice selection criteria, from a plurality of slices of storage provisioned for use by the file system. First processing is performed on the first slice that creates at least one window of free blocks in the first slice for use by the file system. It is determined, in accordance with termination criteria, whether to process one or more additional slices of the file system to create additional windows of free blocks for use by the file system. Such processing to create free windows may be subject to various limits of resource consumption.

20 Claims, 10 Drawing Sheets

TECHNIQUES FOR CREATING WINDOWS OF FREE BLOCKS IN A FILE SYSTEM IN ACCORDANCE WITH TRIGGER CONDITIONS, SLICE SELECTION CRITERIA AND TERMINATION CRITERIA

BACKGROUND

Technical Field

This application generally relates to data storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method of creating windows of free blocks in a file system comprising: selecting, in accordance with trigger conditions, the file system; selecting, in accordance with slice selection criteria, a first slice from a plurality of slices of storage provisioned for use by the file system; performing first processing on the first slice that creates at least one window of free blocks in the first slice for use by the file system; and determining, in accordance with termination criteria, whether to process one or more additional slices of the file system to create additional windows of free blocks for use by the file system. The first processing may include selecting a first window of blocks including at least one free block and a set of one or more consumed blocks, wherein said first window of blocks is included in the first slice of the file system; and relocating data stored in the set of one or more consumed blocks of the first window to a target location, wherein, after said relocating, the first window includes only free blocks. The trigger conditions may include a number of slices provisioned for the file system is greater than a threshold number of slices, a percentage of free windows including only free blocks of the file system is less than a threshold percentage of free windows, and a percentage of relatively free slices of the file system is less than a threshold percentage of relatively free slices, wherein each of the relatively free slices includes at least a defined number or percentage of free blocks. The file system selected may meets all the trigger conditions. First storage may be provisioned for use by the file system from a logical device, where the first storage may include a plurality of slices including the first slice. The at least one window of free blocks may be a set of blocks having contiguous logical addresses in an address space of a logical device. The termination criteria may include a first amount of free windows created by a current iteration of processing, a second amount of slices of the file system have been processed in a current iteration of processing, a third amount of free windows are found present in the file system, and whether there are any remaining candidate slices of the file system meeting the selection criteria. The step of determining may include determining not to process any additional slices of the file system if the first amount of free windows has been created in a current processing iteration of the file system. The step of determining may include determining not to process any additional slices of the file system if the second amount of slices of the file system have been processed in a current processing iteration of the file system. The step of determining may include determining not to process any additional slices of the file system if there are no remaining candidate slices of the file system meeting the selection criteria or if any resource consumption limit specified for creating free windows has been exceeded. The step of determining may include determining not to process any additional slices of the file system if the third amount of free windows are present in the file system. The slice selection criteria may include a first criterion where there is no allocation reference cursor positioned within a slice, the allocation reference cursor denoting a next block location from which storage is consumed by the file system in connection with servicing I/O operations for the file system. The slice selection criteria may include a second criterion where an amount of file system blocks consumed from a slice is below a threshold. The slice selection criteria may include a third criterion where a number of free windows including only free blocks in a slice is below a minimum threshold. The slice selection criteria may include a fourth criterion where there is at least one partial window of blocks in a slice, said partial window including at least a threshold number or percentage of consumed blocks including data that may be relocated. The plurality of slices may be candidate slices of storage each meeting all of the criterion in the slice selection criteria.

In accordance with another aspect of the invention is a computer readable medium comprising code stored thereon that, when executed, performs a method of creating windows of free blocks in a file system comprising: selecting, in accordance with trigger conditions, the file system; selecting, in accordance with slice selection criteria, a first slice from a plurality of slices of storage provisioned for use by the file system; performing first processing on the first slice that creates at least one window of free blocks in the first slice for use by the file system; and determining, in accordance with termination criteria, whether to process one or more additional slices of the file system to create additional windows of free blocks for use by the file system. The first processing may include selecting a first window of blocks including at least one free block and a set of one or more consumed blocks, wherein said first window of blocks is included in the first slice of the file system; and relocating data stored in the set of one or more consumed blocks of the first window to a target location, wherein, after said relocating, the first window includes only free blocks. The trigger conditions may include a number of slices provisioned for the file system is greater than a threshold number of slices, a percentage of free windows including only free blocks of the file system is less than a threshold percentage of free windows, and a percentage of relatively free slices of the file system is less than a threshold percentage of relatively free slices, wherein each of the relatively free slices includes at least a defined number or percentage of free blocks, and wherein the file system selected meets all the trigger conditions.

In accordance with another aspect of the invention is a system comprising: a processor; and a memory comprising code stored therein that, when executed, performs a method of creating windows of free blocks in a file system comprising: selecting, in accordance with trigger conditions, the file system; selecting, in accordance with slice selection criteria, a first slice from a plurality of slices of storage provisioned for use by the file system; performing first processing on the first slice that creates at least one window of free blocks in the first slice for use by the file system; and determining, in accordance with termination criteria, whether to process one or more additional slices of the file system to create additional windows of free blocks for use by the file system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
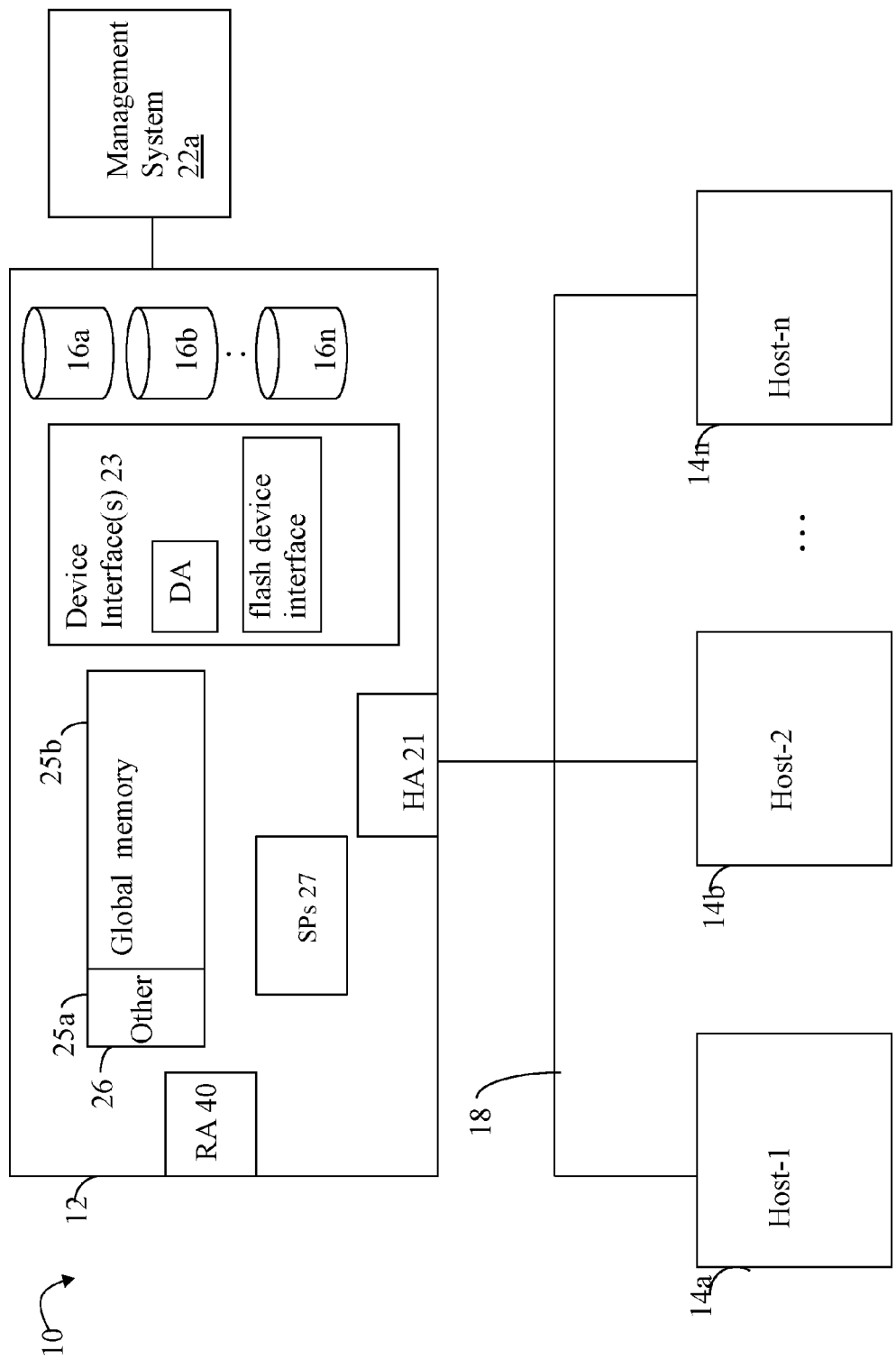
FIGS. 1 and 4 are examples of components that may be included in an embodiment in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also be referred to as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices providing non-volatile data storage. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Figure 2:
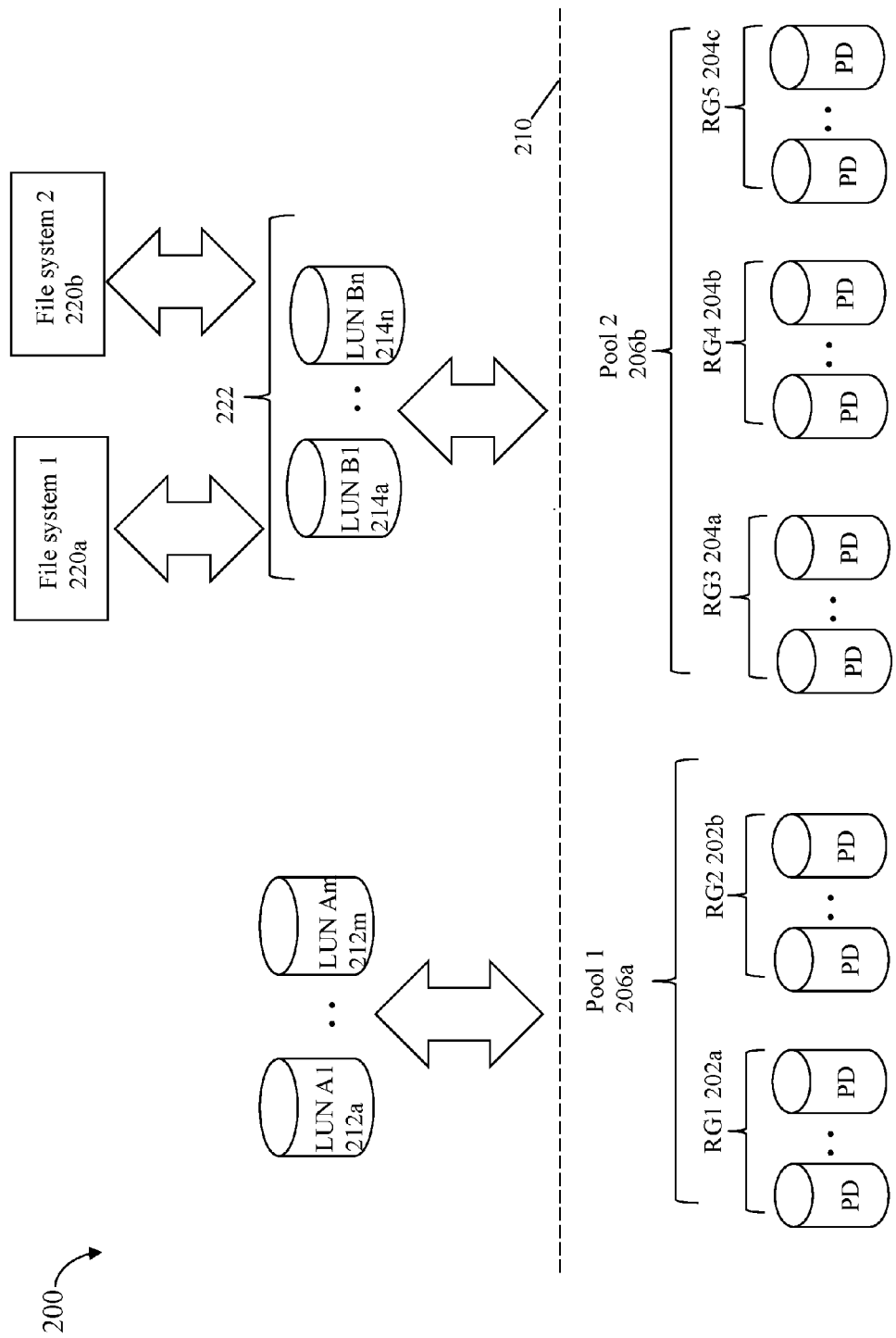
FIG. 2 is an example illustrating physical and logical views of entities in connection with storage in an embodiment in accordance with techniques herein.

In a data storage system in an embodiment in accordance with techniques herein, PDs may be configured into a pool or group of devices where the data storage system may include many such pools of PDs such as illustrated in FIG. 2. Each pool may include one or more configured RAID (Redundant Array of Independent Disks) groups of PDs. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group.

Depending on the particular embodiment, each pool may also include PDs of the same type or technology, or may alternatively include PDs of different types or technologies. For example, with reference to FIG. 2, a first pool, pool 1 2016a, may include a first RAID group (RG) of 10K RPM rotating disk drives (denoted as RG1 202a) and also include a second RG of flash-based drives (denoted as RG2 202b). A second pool, pool 2 206b, may include 3 RGs (denoted RG3 204a, RG 4 204b and RG 5 204c) each of which includes only flash-based drives.

The components illustrated in the example 200 below the line 210 may be characterized as providing a physical view of storage in the data storage system and the components illustrated in the example 200 above the line 210 may be characterized as providing a logical view of storage in the data storage system. The pools 206a-b and RGs 202a-b, 204a-c of the physical view of storage may be further configured into one or more logical entities, such as LUNs or logical devices. For example, LUNs 212a-m may be configured from pool 1 206a and LUNs 214a-n may be configured from pool 206b.

A data storage system may support one or more different types of logical devices presented as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. Thus, at any point in time, not all portions of the logical address space of a virtually provisioned device may be associated or mapped to allocated physical storage depending on which logical addresses of the virtually provisioned LUN have been written to at a point in time.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Generally, techniques described in following paragraphs may be used in connection with thick or regular LUNs as well as thin or virtually provisioned LUNs. For example, LUNS 214a-214n may be thick or regular LUNs, may be virtually provisioned LUNs, or may be a combination of thick or regular LUNs and virtually provisioned LUNs.

It should be noted that the total usable capacity denoting a total logical capacity of LUNs (where at least one of the LUNs is a thin LUN) configured from a pool may exceed the physical capacity of the underlying PDs. For example, the total usable capacity denoting the total logical capacity of LUNs 212a-m, which includes at least one thin LUN, may exceed the amount of physical storage capacity of PDs of the pool 1 206a. Similarly, the total usable capacity denoting the total logical capacity of LUNs 214a-n, which includes at least one thin LUN, may exceed the amount of physical storage capacity of PDs of the pool 2 206b. The amount by which the total logical capacity or total usable capacity of all LUNs in a specified set exceeds the physical storage capacity, such as of a pool, may be referred to as an oversubscribed capacity.

LUNs configured from a pool may be further mapped to one or more other logical entities. For example, referring again to FIG. 2, group 222 of LUNs 214a-n may be configured as thin or virtually provisioned LUNs which are used to provide physical storage for file systems, such as file system 1 220a and file system 2 220b. The file systems 220a-b may be any suitable file system known in the art such as an NFS (Network File System) file system or a CIFS (Common Internet File System) file system.

In a data storage system using thin or virtually provisioned LUNs, such thin LUNs 214a-n may present to the file systems 220a-b a large total usable capacity when such thin LUNs may not be fully backed by physical storage equal to the total usable capacity. Thus, clients and applications using the file systems 220a-b are presented with a virtual maximum size of the file systems 220a-b of which only a portion may be physically allocated for the associated LUNs 222 providing the backing storage for the file systems 220a-b. In a similar manner, the file systems 220a-b may be presented with LUNs 222 having a large total usable or logical capacity when in fact the underlying LUNs 222 may not be fully backed by physical storage. The foregoing for thin LUNs may be contrasted, for example, with the case where all the LUNs 222 are thick or regular LUNs whereby the total usable capacity of the LUNs 22 has physical storage provisioned and mapped for use with such regular LUNs.

Figure 3:
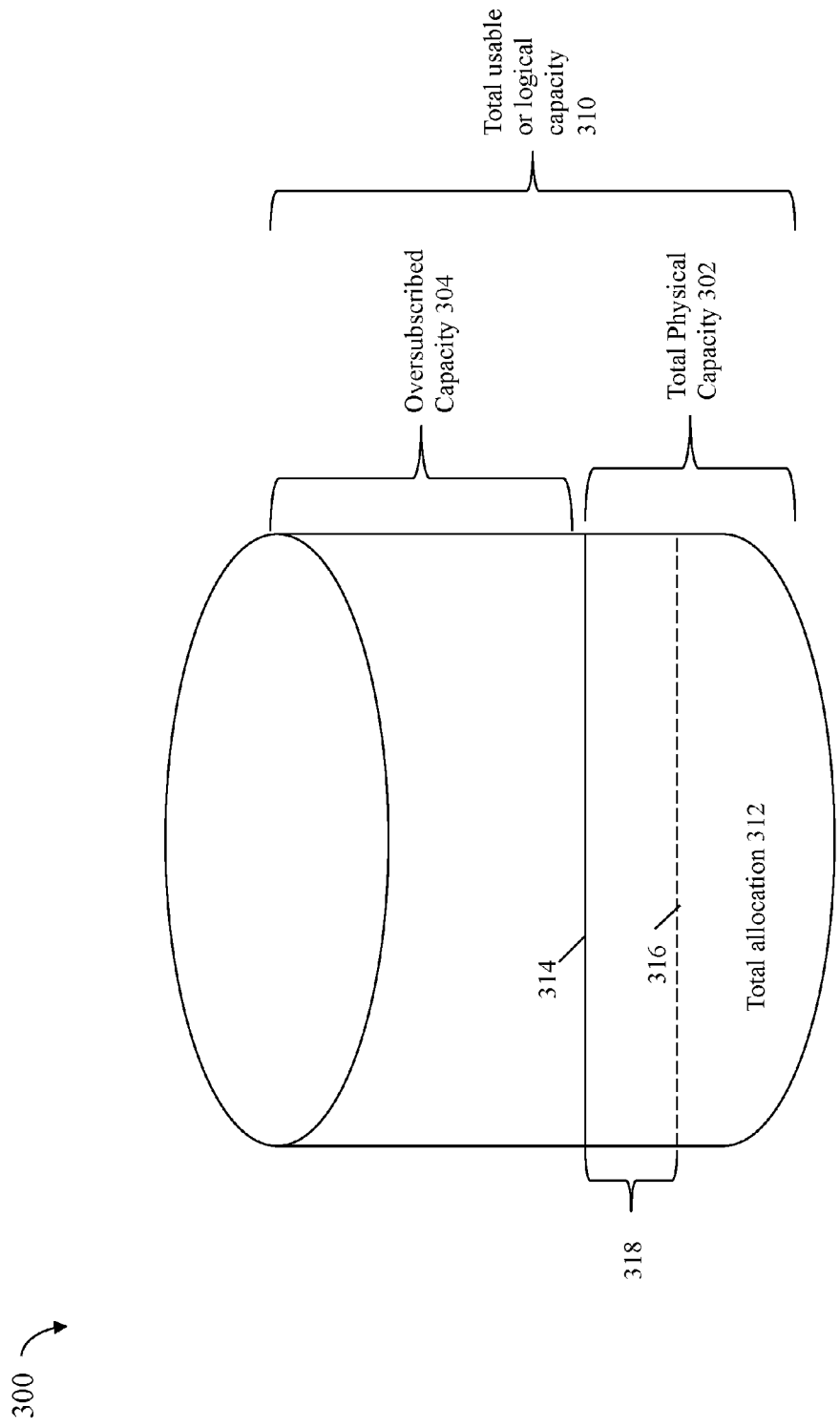
FIG. 3 is an example illustrating oversubscription such as in connection with thin or virtually provisioned devices in an embodiment in accordance with techniques herein.

Referring to FIG. 3, shown is an example 300 illustrating oversubscription in connection with a pool from which thin LUNs are configured in an embodiment in accordance with techniques herein. The example 300 illustrates the total usable or logical capacity 310 collectively denoting the sum or aggregate usable or logical capacity of all LUNs configured from a pool. Element 310 may represent, for example, the total capacity as reported to the host or other user of the pool. The total physical capacity 302 may denote the total physical storage capacity of the pool. The oversubscribed capacity 304 may denote the amount of total usable or logical capacity 310 that exceeds the physical storage capacity 302 of the pool. Element 312 may denote the current total allocation or amount of the physical capacity currently allocated/assigned to the LUNs provisioned from the pool. Line 316 denotes the total allocation amount depicted by 312. Line 314 may denote the total physical capacity depicted by 302. Element 318 may denote the amount of physical storage capacity remaining in the pool before the pool's physical storage capacity is completely consumed.

When an application writes data for the first time to a particular location in a file system built on thin LUNs (e.g., having its storage provided by thin LUNs such as file system 220a-b of FIG. 2), space is allocated from the pool providing the backing physical storage for the thin LUNs. For example, with reference back to FIG. 2, when an application writes data to file system 1 220a, physical storage is allocated from the underlying physical storage pool 2 206b and the file system 1 220a grows. When data is deleted from the file system 1 220a, storage previously allocated may stay with the file system 1 220a. Such storage may be marked for overwrite or reuse, for example, where writing new data to the file system 1 220a may reuse such storage. Some embodiments may have a space reclamation process where such previously allocated storage currently marked for reuse may be returned as free storage blocks to the pool 206b.

Referring back to FIG. 2, assume an example where the LUNs 222 are regular or thick LUNs having physical storage provisioned from Pool 2 206b. In this case, a write to file system 1 220a may result in allocating storage from one or more of the LUNs 222 whereby such physical storage is thus located in pool 2 206b).

Over time, a file system may be characterized as fragmented whereby storage for its files may be allocated in small block portions of the underlying LUNs. Each such small block portion may denote a logically contiguous set of LUN blocks or locations where the different contiguous block portions may be scattered or fragmented through the logical address space of the underlying LUN(s). Once a file system is fragmented, new sequential writes may not find contiguous free block sets within LUN address space to be allocated for a file. The foregoing may result in performance bottleneck in file systems, for example, having backing storage on physical storage devices such as rotating disk drives as well as in cases where rotating disk drives may be used in combination with flash or other solid state storage devices. Described in following paragraphs are techniques that may be used in an embodiment in accordance with techniques herein to create large contiguous free block sets of LUN address space that may be allocated for use, for example, with a file system. In accordance with at least one embodiment of techniques herein, a greedy strategy may be performed to traverse allocated blocks in a file system in limited scope using localized information to perform selective block relocation whereby large contiguous areas of free blocks are freed up or made available for future allocations, such as future sequential allocations in connection with large writes of new file data. Techniques herein provide for selective identification of blocks of data which are relocated to make available large contiguous areas of free blocks where each such contiguous area denotes a contiguous range of free blocks or logical addresses of a LUN.

Figure 4:
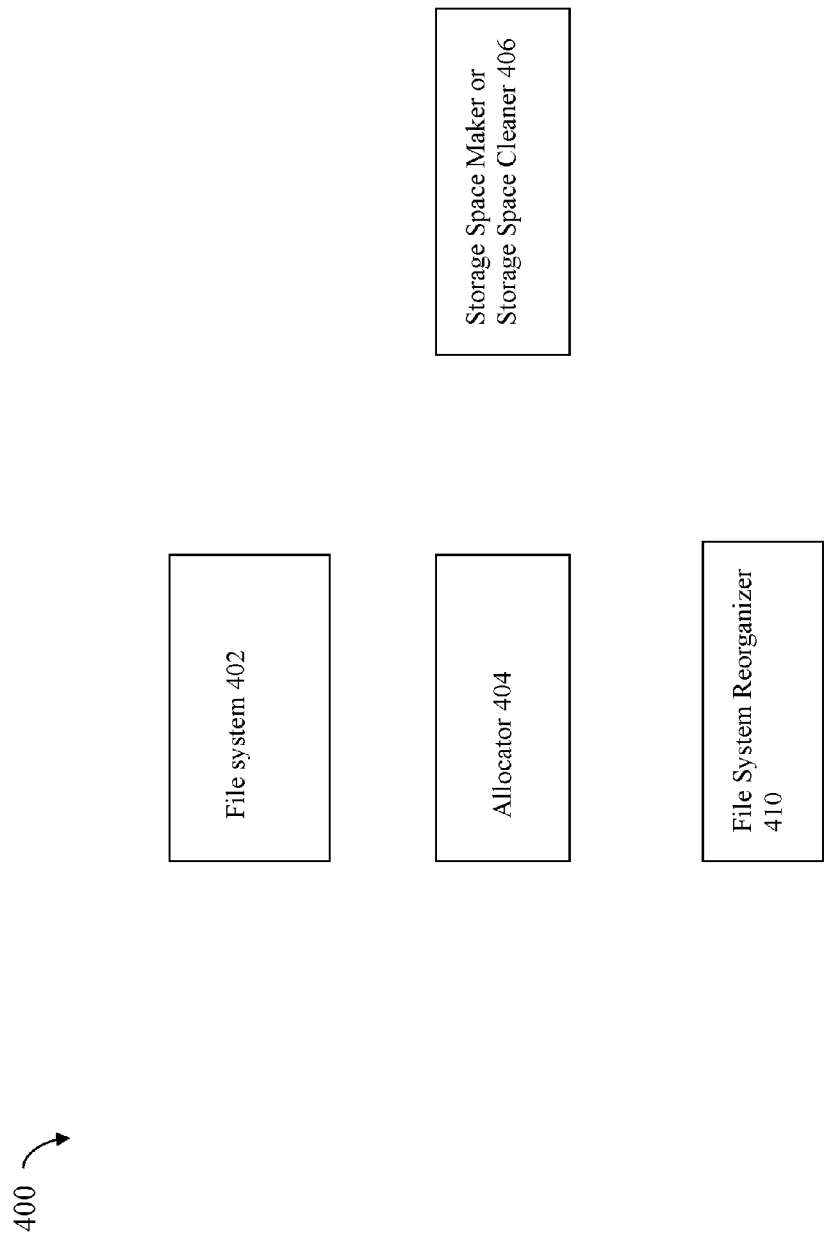

Referring to FIG. 4, shown is an example of components that may be included in an embodiment in accordance with techniques herein. The example 400 includes a file system 402, an allocator 404, a storage space maker or storage space cleaner 406 and a file system reorganizer. It should be noted that although only a single file system 402 is illustrated, techniques herein may be used in connection with multiple file systems as mentioned elsewhere wherein.

In at least one embodiment in accordance with techniques herein, a file system 402 may obtain storage for use from a storage allocator 404. For example, when a write request is received which writes data to a file, the write may result in the file system 402 communicating with the storage allocator 404 to request additional storage for storing the new write data to the file. Consistent with description elsewhere herein, the allocator 404 may provision storage for the request from a pool LUN providing physical storage for the file system 402.

An embodiment in accordance with techniques herein may include another component referred to herein as a storage space maker or storage space cleaner 406 which performs processing to create large contiguous areas of free blocks or logical addresses of a LUN. Such processing as may be performed by the storage space maker or cleaner 406 in an embodiment in accordance with techniques herein is described in more detail in following paragraphs.

A slice may refer to a storage allocation unit or storage provisioning unit. Storage may be allocated, for example, for use with thin or virtually provisioned LUNs from a storage pool of physical storage devices as described herein in storage allocation units referred to as slices. Each slice may be further divided into a number of logical contiguous block sets where each such contiguous block set may be referred to as a window.

In one embodiment, the allocator 404 may be storage allocator which allocates storage in chunks to the file system in units which are slices. Thus, requests for storage allocation made from the file system 402 to the storage allocator 404 may be units or chunks which denote a number of one or more slices. Generally, a slice may be any suitable size for use in an embodiment in accordance with techniques herein. The file system 402 may then consume for data storage individual blocks within an allocated slice as needed.

The storage space maker or storage space cleaner 406 creates windows in allocated file system slices which are completely free or include only free blocks in place of partially free windows. A partially free window (also referred to sometimes as a partial window) as described elsewhere herein includes at least one free block and wherein at least one block of the window is also consumed for storing data of the file system. The storage space maker or storage space cleaner 406 uses the file system reorganizer 410 to relocate blocks from source locations of file system slices to target locations in the file system with the goal of obtaining windows which include only free blocks. Generally, the file system reorganizer 410 relocates blocks of data from a partially free source window (e.g., including a combination of both currently consumed blocks storing data and currently free blocks) of the file system to a target location in the file system so that the source window is completely free (e.g. includes only free blocks available for consumption by the file system). Described in following paragraphs are techniques that may be embodied within the storage space maker or cleaner 406 to reduce number of partial windows in slices allocated to the file system and create windows of free blocks in slices allocated to the file system. Techniques herein decide what data blocks to move or relocate in a manner that does not directly contend with production I/O by avoiding slices to clean where such slices are currently used for production I/Os. As described in following paragraphs, blocks are consumed by production I/Os from windows that have only free blocks or some amount of free blocks. One or more current cursors may be maintained and used in a file system. Each current cursor may denote a block or location in the file system currently used in connection with servicing I/O operations. For example, a current cursor may denote a block location from which storage is to be next allocated for use with storing new write data for a write operation. As another example, a current cursor may denote a block location at which data is stored where such data is being retrieved in connection with servicing a read request. Thus, generally, a current cursor denotes or identifies a block location which should be avoided in connection with creating windows of only free blocks in order to avoid contention between processing for I/O operations and processing performed in connection with techniques herein for creating windows of only free blocks. The foregoing and other aspects of processing performed in an embodiment in accordance with techniques herein are described in more detail below.

Figure 5:
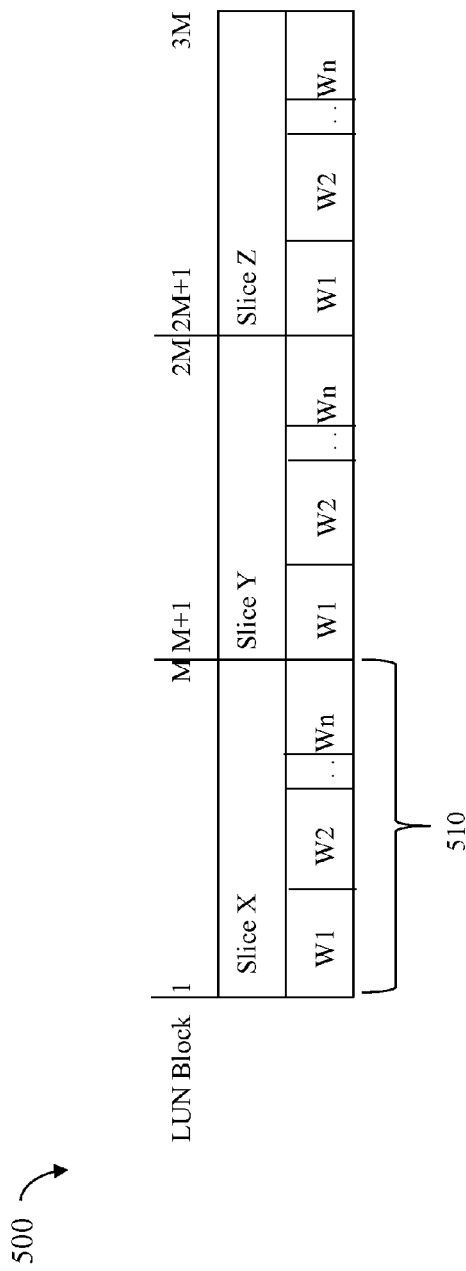
FIG. 5 is an example illustrating partitioning of a logical device's address space into slices and windows in an embodiment in accordance with techniques herein.

Referring to FIG. 5, shown is an example illustrating slices and windows in an embodiment in accordance with techniques herein. The example 500 includes 3 slices—Slice X, Slice Y and Slice Z—comprising a single LUN's address space. Each slice may be a particular size, such as M logical blocks or locations where each such logical block refers to a logical location or LBA (logical block address) in a LUN's address space. In this example, Slice X may map to LBAs 1 through M, inclusively, in the LUN's address space. Slice X may be partitioned into N windows represented as element 510. Each of the N windows, denoted windows W1 through Wn inclusively in 510 may represent a number of contiguous logical blocks of the LUN. In a similar manner, each slice, such as each of Slices X, Y and Z, may represent a contiguous number of M logical blocks of the LUN. Slice Y may map to LBAs M+1 through 2M, inclusively, in the LUN's address space. Slice Y may be partitioned into N windows in a manner similar to that as described for Slice X. Slice Z may map to LBAs 2M+1 through 3M, inclusively, in the LUN's address space. Slice Z may be partitioned into N windows in a manner similar to that as described for Slice X.

Each window, such as W1 of slice X, may include a number of blocks and, at any point in time, storage for each such block may be free or may otherwise be unavailable or consumed by the file system by having data stored at the block. A free window as used herein may refer to a window that includes only free blocks where the window is in a slice allocated for use by the file system but the file system currently does not consume or use any block in the window for storing data.

It should be noted that the foregoing example of FIG. 5 includes only 3 slices for purpose of simplicity of illustration of techniques herein. More generally a LUN's address space may be partitioned into any suitable number of slices and each such slice may be partitioned into any suitable number of windows.

In at least one embodiment in accordance with techniques herein, the storage space maker or cleaner 406 may be enabled for use with both thin or virtually provisioned LUNs as well as thick or regular LUNs.

Activity and processing performed by the storage space maker or cleaner 406 may be subjected to one or more processing limits in order to avoid overconsumption of system resources. Such limits may be characterized as system wide limits, such as limits on system resource consumption, and additionally limits as described herein per file system that is processed (e.g., limits such as related to termination criteria as described herein). For example in one embodiment, the storage space maker or cleaner 406 may impose limits on resources consumed at any point in time. For example, such limits may relate to a maximum amount of CPU time consumed vs. an amount of CPU time consumed for I/O processing or other activity, a maximum amount of DA utilization allowed to be consumed at any point in time or over a defined time period, a maximum amount of memory that may be consumed at any point in time, a maximum amount of disk or physical storage bandwidth that may be consumed at any point in time, a maximum number of file systems for which processing may be performed by the storage space maker or cleaner 406 at any point in time, and the like. The foregoing limits, and optionally other limits, may be configurable in an embodiment in accordance with techniques herein to maximize resource utilization by the storage space maker or cleaner 406 performing processing to create free windows as described herein.

As described in more detail in following paragraphs, the allocator 404 of FIG. 4 may invoke the storage space maker or cleaner 406 of FIG. 4 to create additional windows of only free blocks responsive to an occurrence of one or more trigger conditions. Generally, whether a trigger condition has occurred may be decided in accordance with one or more heuristics. Thus, the one or more heuristics may be used in connection with deciding when to start or commence processing performed by the storage space maker or cleaner 406 with respect to a particular file system. In at least one embodiment in accordance with techniques herein, the storage space maker or cleaner 406 may commence processing for the particular file system when the following three trigger conditions evaluate to true:

the number of slices provisioned for the file system is greater than a threshold number of slices;

the percentage of free windows (e.g., windows including only free blocks) of the file system falls below a threshold percentage of free windows; and the percentage of relatively free slices of the file system falls below a threshold percentage of relatively free slices.

A relatively free slice noted above may be defined as a slice which includes at least a defined number or percentage of free blocks. For example, a slice may be characterized as relatively free if at least 50% of the blocks in the slice are free. In at least one embodiment, the threshold number or percentage of relatively free slices may be, for example 30%. In connection with the foregoing three conditions defined using heuristics, all thresholds and amounts may be configurable and may vary with embodiment. Examples of threshold and amounts provided herein are for illustration purposes and more generally, any suitable values may be used.

In at least one embodiment, all three of the foregoing trigger conditions must be true with respect to a particular file system in order to trigger performing processing by the storage space maker or cleaner 406 with respect to the particular file system to create free windows.

Since a goal of techniques herein is not to compete with production I/Os, additional heuristics used in connection with slice selection criteria may be considered to select a few slices at a time for cleaning in accordance with techniques herein where each selected slice meets the slice selection criteria. In at least one embodiment, the number of slices selected may be, for example, three or some other suitable number. Additionally, a slice may selected for cleaning and processing in accordance with techniques herein if the slice meets all of the one or more slice selection criteria that will now be described. A slice may be selected for cleaning and processing in accordance with techniques herein based on a first criterion where there is no allocation reference cursor positioned within the slice. An allocation reference cursor may denote a next block location of the slice from which storage is being allocated or consumed by the file system in connection with servicing I/O operations for the file system. This first criterion uses a heuristic which avoids contention with production I/Os. A slice may be selected for cleaning and processing in accordance with techniques herein based on a second criterion where an amount of file system blocks consumed from the slice is below a configured threshold. This second criterion is to avoid relocating or moving data from a source slice that is mostly full or consumed. A slice may be selected for cleaning and processing in accordance with techniques herein based on a third criterion where the number of free windows (e.g., windows including only free blocks) in the slice is below a configured minimum threshold. This third criterion is to avoid operating on slices that have a good probability of being selected for next incoming production I/O writes to store the I/O write data. A slice may be selected for cleaning and processing in accordance with techniques herein based on a fourth criterion where there is at least one partial window in the slice. In one embodiment in accordance with techniques herein, a partial window may be a window that includes at least a threshold number or percentage of used or consumed blocks (e.g., at least a specified percentage or number of consumed blocks including data that may be relocated or moved). This fourth criterion is to ensure useful processing of techniques herein. In at least one embodiment in accordance with techniques herein, all four of the foregoing criteria must be true with respect to a slice in order for the slice to be selected for processing in accordance with techniques herein. In one aspect, a slice meeting the foregoing four criteria is selected as a source slice from which blocks of data are relocated or moved to a target location in order to free such blocks of the selected slice.

In at least one embodiment in accordance with techniques herein, there may be multiple slice candidates meeting the foregoing four criteria. An embodiment in accordance with techniques herein may use any suitable technique for selecting a specified number of such slice candidates for processing in accordance with techniques herein. For example, one embodiment may traverse slices in a random or other order and may select for processing the first number of such slices meeting the foregoing four criteria. Another embodiment may keep a prioritized list of slices denoting a ranking of slice candidates meeting the foregoing four criteria. For example, the slice candidates may be prioritized or ranked based on a score determined for each slice based on the foregoing four criteria. The list may be sorted based on slice scores, from highest score to lowest score, and slices may be selected from the list having the highest scores. In one embodiment, the score for a slice based on the foregoing four criteria may be expressed as in EQUATION E1 below:

$$\text{Score Slice } I = (V1*W1) + (V2*W2) + (V3*W3) + (V4*W4)$$

where

V1 denotes the value of criterion1 for slice I where criterion1 may be the first criterion noted above for use in slice selection;

W1 denotes a weight or level of importance of criterion 1 in selecting a slice as a source slice for processing in connection with techniques herein;

V2 denotes the value of criterion2 for slice I where criterion2 may be the second criterion noted above for use in slice selection;

W2 denotes a weight or level of importance of criterion 2 in selecting a slice as a source slice for processing in connection with techniques herein;

V3 denotes the value of criterion1 for slice I where criterion3 may be the third criterion noted above for use in slice selection;

W3 denotes a weight or level of importance of criterion 3 in selecting a slice as a source slice for processing in connection with techniques herein;

V4 denotes the value of criterion4 for slice I where criterion1 may be the fourth criterion noted above for use in slice selection; and W4 denotes a weight or level of importance of criterion 4 in selecting a slice as a source slice for processing in connection with techniques herein.

The weights W1-W4 may be varied depending on the importance of the different criteria in an embodiment in accordance with techniques herein. The score computed by EQUATION E1 may be characterized as a weighted average based on the four criteria and different weights associated with the four criteria.

An embodiment in accordance with techniques herein may perform processing such as by the storage space maker or cleaner 406 for a file system and may terminate processing for the file system after reaching a given goal. In other words, processing to create free windows for the file system may stop in accordance with meeting one or more termination criteria. In at least one embodiment, the termination criteria may include reaching any one or more of: creating a minimum number of free windows and/or processing a specified number of slices of the file system. For example, in one embodiment, processing to create free windows in accordance with techniques herein for a file system may terminate after the first occurrence of any one or more specified conditions such as upon the first occurrence of any of the following: the minimum number of free windows has been created (e.g., such as in a current iteration of processing performed for the file system), when at least the specified number of slices of the file system have been processed (e.g., such as in a current iteration of processing performed for the file system), and when a configured high watermark of free windows are found to be present on the file system. Note that the foregoing conditions may be included in termination criteria described elsewhere herein. Such termination criteria is one set of criteria that may be used in an embodiment in accordance with techniques herein to limit processing performed on a file system. Thus, the embodiment may terminate processing when at least one of the foregoing termination criteria evaluates to true. The particular goal, such as the parameter denoting the minimum number of free windows and/or the parameter denoting the specified number of slices used in the termination criteria, may be configurable in an embodiment in accordance with techniques herein. For example, the foregoing parameters may be calculated programmatically prior to each round of processing on a file system in accordance with techniques herein. The particular values selected for the parameters may vary with the current utilization rates and/or I/O information, such as related to I/O workload and/or performance of I/O on the data storage system, at the current time processing is performed on the file system in accordance with techniques herein to create free windows in the file system.

As described herein, the file system reorganizer 410 of FIG. 4 may perform processing to evacuate or relocate data from a partially consumed window (partial window) to a new target location in the file system thereby converting the partially consumed window to a free window including only free blocks. In one embodiment, the target location may be randomly selected using a random window cursor where a target window is randomly selected into which the source location data is packed.

Figure 6A:
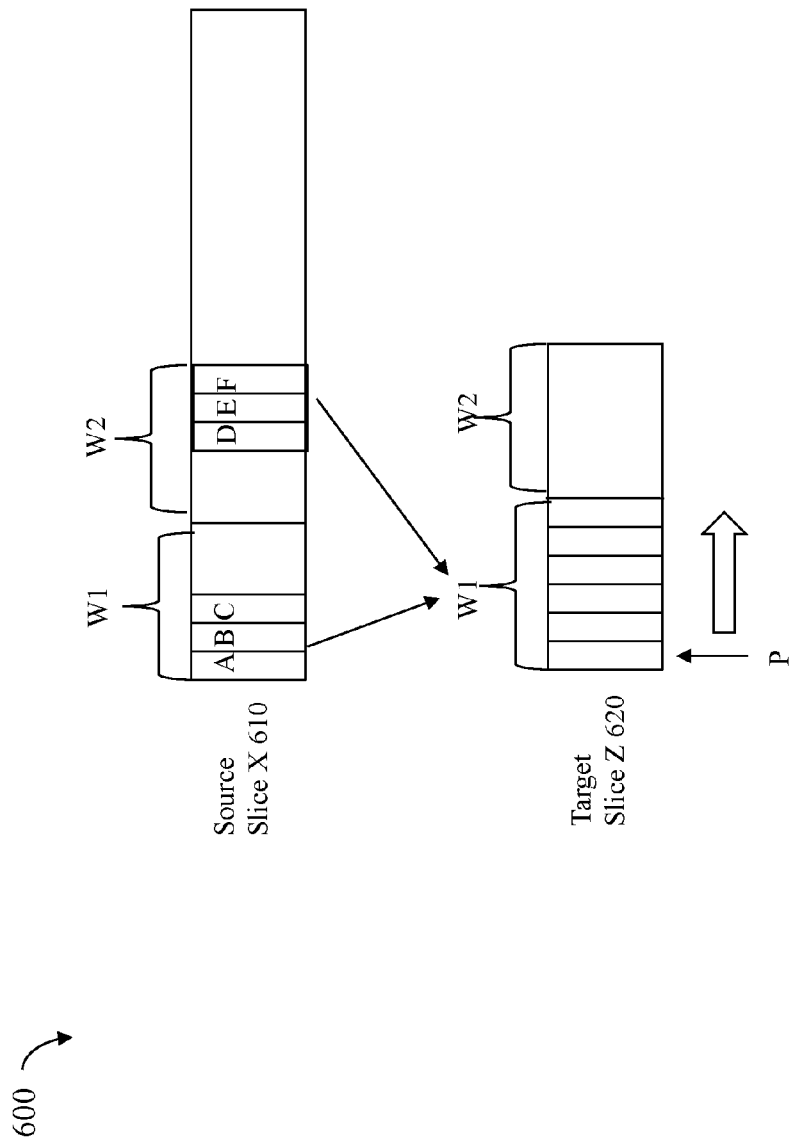
FIGS. 6A, 6B, 7A, and 7B are examples illustrating relocation of data blocks from partial windows in an embodiment in accordance with techniques herein.

For example with reference to FIG. 6A, shown is an example 600 illustrating how data may be moved or relocated (e.g., evacuated) from source windows to a target window in an embodiment in accordance with techniques herein. The example 600 includes source slice X 610 with two windows W1 and W2 which are partial windows including a mix of free blocks and consumed blocks. In this example, window W1 of slice X includes 3 consumed blocks A, B and C with data and window W2 of slice X includes 3 consumed blocks D, E, and F with data. Processing may be performed to evacuate and relocate data for blocks A, B, C, D, E, and F of Slice X to a target location. In this example, the target location may be window W1 of target slice Z 620. P may denote the random window cursor used to identify the target window location to which the evacuated data of blocks A, B, C, D, E, and F is copied. In particular, P identifies the starting or first block location to which the foregoing data from the source windows W1 and W2 of slice X is copied. It should be noted that the data is copied to the target location denoted by P and stored in a packed form whereby the data of blocks A, B, C, D, E, and F is stored at logically consecutive target block locations. The example 600 may denote the source windows W1 and W2 of source slice X 610 and target slice Z 620 prior to performing movement or evacuation of data from the source slice X 610.

Figure 6B:
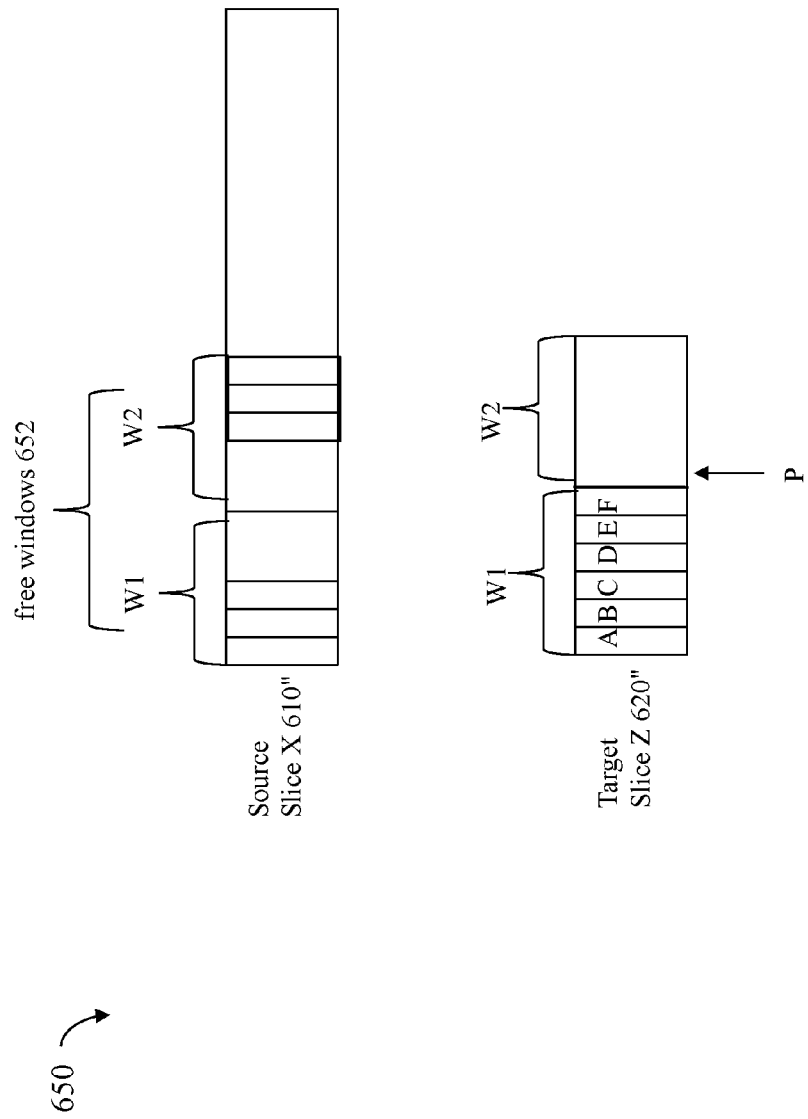

Referring to FIG. 6B, shown is an example 650 of the source slice X 610" and target slice Z 620" after the evacuation of data from W1 and W2 of source slice X has completed As illustrated, element 652 denotes that windows W1 and W2 of source slice X are free windows after completing evacuation to move data from blocks A, B, C, D, E and F to W1 of target slice Z.

In one embodiment, the target location may be selected to maximize packing of data from source location(s) or source windows. For example, the target location selected may include free windows. If there is no target location including free windows, slot fitting may be performed where the data from the source locations is copied to a target location to first free block locations.

Figure 7A:
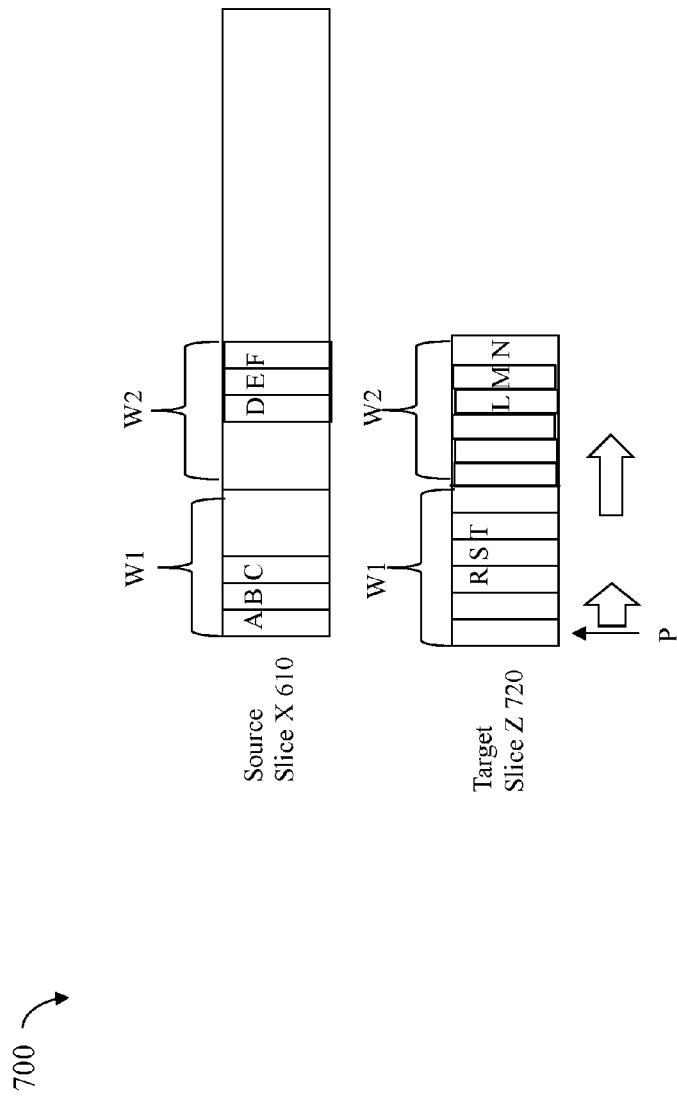

For example, with reference to FIG. 7A, shown is a state of source slice X 610 and a different target slice Z 720 prior to performing evacuation of data from the source slice X 610. P may again denote the random window cursor starting location of the target slice Z 720 to where data is copied from source windows W1 and W2 of slice X 61-. However, in this example 700, assume the target slice 720 does not include a free window of all free blocks. In this example, prior to evacuating the partial windows W1 and W2 of source slice X 610, the target slice Z 720 includes two partial windows W1 and W2 including data in blocks R, S, T and L, M and N as illustrated. Thus, element 720 denotes the target location prior to evacuating and copying data from the source slice X windows W1 and W2 to the target location having a starting block denoted by P.

Figure 7B:
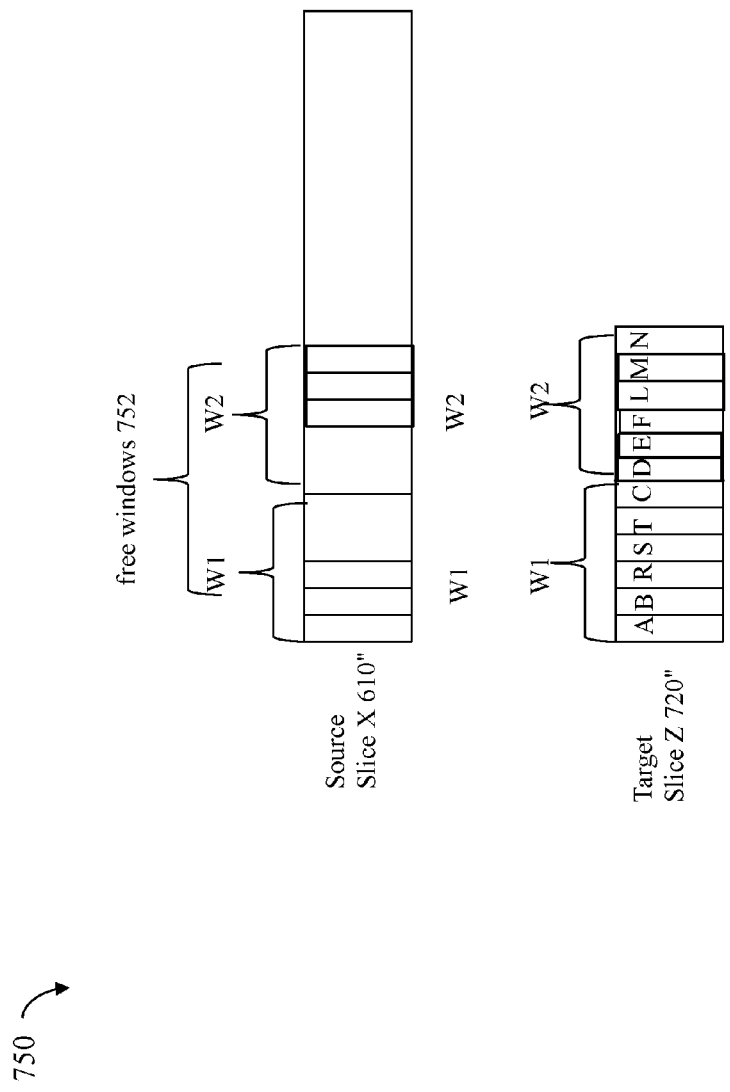

With reference to FIG. 7B, shown is an example 750 of the source slice X 610" and target slice Z 720" after the evacuation of data from W1 and W2 of source slice X 610 of FIG. 7A has completed. Target slice Z 720" denotes the target slice Z after the data from blocks A, B, C, D E and F of the source slice X has been copied to the target location in target slice Z. In this example, element 720" denotes that the data is copied from the source location, block by block, and stored in the next available target block location in a packed arrangement. As illustrated, element 752 denotes that windows W1 and W2 of source slice X 610" are free windows after completing evacuation to move data from source slice X to W1 of target slice Z.

Processing performed by the storage space maker or cleaner 406 may also terminate in response to an occurrence of an additional termination condition denoting that there may be a change with respect to free windows on the selected file system. For example, if there is an operation also started on the file system that may result in freeing additional blocks of the file system or moving or relocating data of the file system, processing in connection with techniques herein as may be performed by the storage space maker or cleaner 406 on the file system may terminated. Such an operation may include, for example, performing slice evacuation or processing by the file system reorganizer to create free windows or otherwise move data of the file system in connection with another operation or task results in termination of processing by the storage space maker or cleaner 406. Additionally, if the file system is unmounted and therefore means that the file system is going into an inactive state, then processing performed by the storage space maker or cleaner 406 to create free windows in accordance with techniques herein may be terminated since the file system will not be used once unmounted. As another example, a snapshot of a file system may be deleted which may result in creation of free windows in the file system.

In accordance with techniques herein, an embodiment may track various heuristics described herein used, for example, with the trigger conditions, slice selection criteria and termination criteria. For example, an embodiment in accordance with techniques herein may use a continuously updated in-memory counter denoting the number of partial windows in each file system. An embodiment in accordance with techniques herein may also use a continuously updated counter, such as may be stored on disk or on another form of non-volatile storage, of the number of free windows in each file system.

An embodiment in accordance with techniques herein may use a goal specified in terms of one or more termination criteria using parameters which may be automatically tuned or selected which may be used to decide when to terminate processing and also when to restart processing again using techniques herein for a next file system. For example, an embodiment may use a function to determine parameter values for the termination criteria (e.g., values for the number of windows to create and the maximum number of slices to process as described elsewhere in connection with termination criteria) in accordance with one or more factors such as the last successful goal of termination criteria (e.g., last set of parameter values for which the goal of termination criteria was achieved), the last goal failed (e.g., the last set of parameter values for which the goal of termination criteria was not achieved), and a current state of a file system. The current state of the file system may characterize its state with respect to one or more aspects affecting the creation of free windows using techniques herein (e.g., one or more parameters, values, heuristics, conditions, and the like, such as described herein, related to any of conditions under which the storage space maker or cleaner processing is started).

An embodiment in accordance with techniques herein may programmatically and automatically determine how many file systems may be concurrently processed using techniques herein for creating free windows. For example, such processing may be performed each time the storage space maker or cleaner 406 is invoked such as by the allocator 404. For example, the number of file systems for which processing herein may be performed concurrently by the storage space maker or cleaner 406 may be in accordance with information collected for the I/O path such as any information related to current resource consumption (e.g., current utilization regarding any of DAs, FAs, CPU, memory, cache, and the like) and the current I/O workload. The current I/O workload may be indicating by one or more metrics related to I/O processing such as a current incoming I/O rate and I/O completion rate, average I/O response time, and the like. Thus, for example, it may be determined that there is currently a heavy I/O workload (e.g., based on the I/O workload metrics) on the system consuming a lot of storage system resource (e.g., based on current resource utilization or other metrics regarding resource consumption) so processing may auto select to only perform processing by the storage space maker or cleaner 406 on a single file system. Later on in the evening after work hours/during off peak hours, such processing may receive a revised set of information regarding current I/O workload and current resource consumption and auto select to perform processing by the storage space maker or cleaner 406 on 5 file systems since such revised information indicates there is a very low or minimal I/O workload at this later point in time.

In summary, is described above, in at least one embodiment in accordance with techniques herein storage may be provisioned to a file system in slices and the file system may then further consume or allocate blocks of the slices for its use, such as for storing data of files in the file system. Each slice may be partitioned into a number of logical large contiguous block sets where each such set is referred to herein as a window. Described above is processing that may be performed in connection with creating free windows from partial windows in a file system that meets trigger conditions. Processing includes scanning through slices in the file system meeting the trigger conditions where such slices also meet slice selection criteria. An embodiment in accordance with techniques herein may implement and track various parameters, metrics, and the like used in connection with trigger conditions, termination criteria and goals, and slice selection criteria using various in-memory counters and on-disk hints/counters as blocks of a slice of a file system are consumed. Generally, slices meeting the slice selection criteria as described herein may be characterized as including partially filled windows indicating reasonable fragmentation. A slice meeting the slice selection criteria is selected for processing from which blocks are relocated from all of its partial windows to thereby make full windows of free blocks available in place of the partial windows. In connection with such relocation, a target slice is determined such as based on a random selection. During processing described herein, various heuristics may be tracked (e.g., how many partial windows have been evacuated, how many slices have been processed, what is the current free window count for the file system, and the like). Such heuristics used in connection with termination criteria as described herein may be used to determine when partial window evacuation of the selected file system (e.g., step 812 of FIG. 8 described below) may stop. For example, once the number of windows evacuated reaches a maximum threshold, number of free windows in the file system moves beyond a minimum threshold and so on, processing of the file system may terminate. The same set of heuristics used in connection with termination criteria may also be used in connection with when to schedule any further block relocation operations for this and other file systems currently active on a storage processor. Additionally, techniques herein may stop processing to create free windows through block relocation on a file system if any other interfering operations are started that could potentially free-up additional windows or otherwise result in a lot of data block movement. Examples of such interfering operations may include, for example, deleting a snapshot of a file system, performing operations on a file system that result in additional storage being provisioned for use by the file system, and the like.

In at least one embodiment in accordance with techniques herein, processing performed by the storage space maker or cleaner (e.g., element 406 of FIG. 4) to create free windows through block relocation of partial windows may be performed independent of what blocks are consumed or owned by what file. An embodiment in accordance with techniques herein may use additional criteria in selection of a target location. For example, processing may consider which file owns or consumes a particular block in connection with selecting a target location. For example, data may be relocated from source blocks currently owned by a first file. In such a case, a target window may be selected which includes partial windows with data blocks consumed by the same first file. To further illustrate, reference is made back to FIG. 7A where data blocks A, B, C, D, E, F, R, S T, L M and N may all be owned by the same file.

Figure 8:
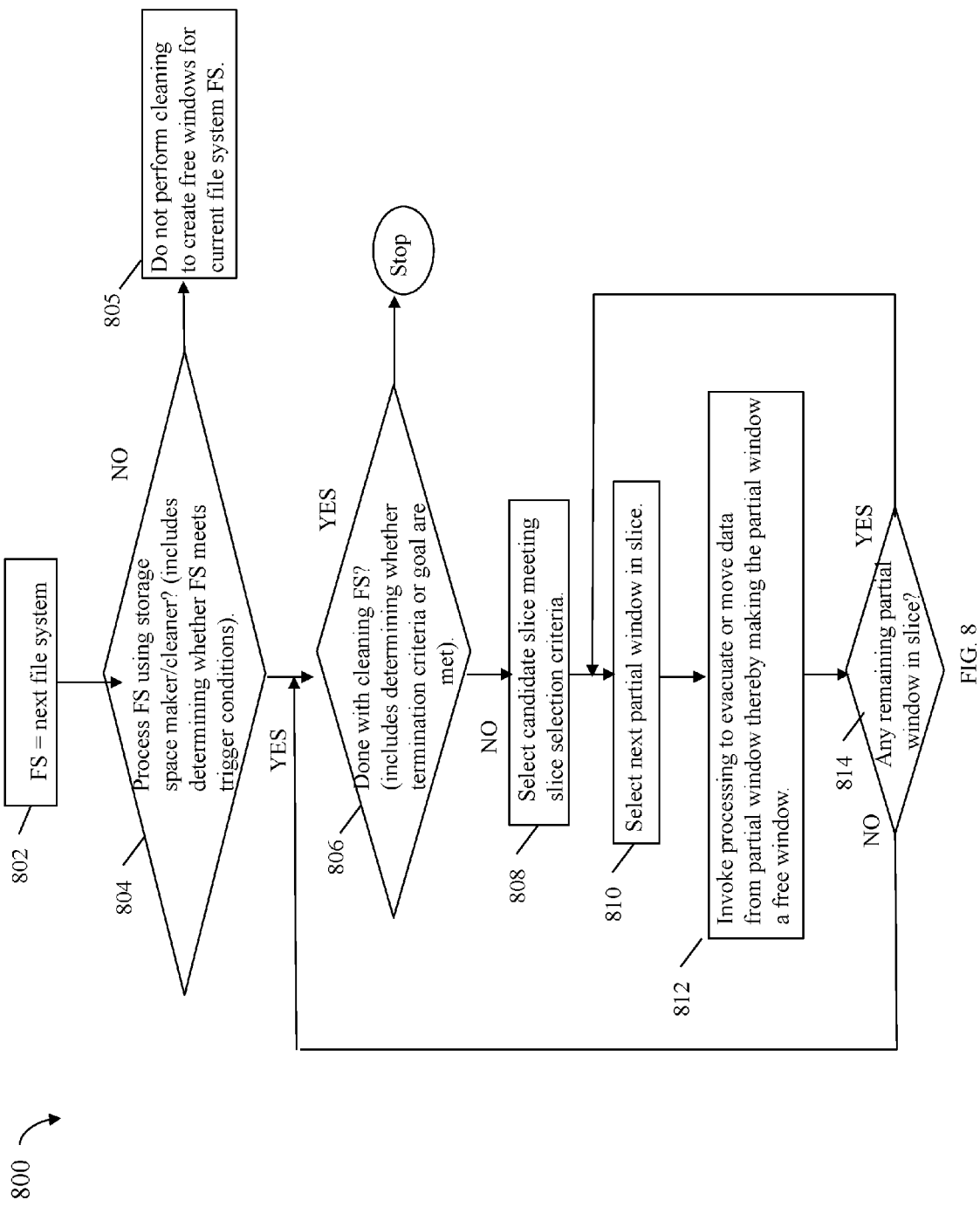
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 800 generally summarizes processing described above. At step 802, the next file system, FS, is selected for potential processing in accordance with techniques herein. At step 804, a determination is made as to whether to start processing of FS using the storage space maker or cleaner to create free windows. Step 804 may include determining whether the current file system FS meets the trigger conditions such as described above. If the trigger conditions are not met for the current file system FS, whereby step 804 evaluates to no, control proceeds to step 805 where processing is not performed for cleaning the FS to create free windows.

If the trigger conditions are met for the current file system FS, whereby step 804 evaluates to yes, control proceeds to step 806. At step 806, a determination is made as to whether processing or cleaning of the FS to create free windows in the FS is done. Step 806 may include determining whether the termination criteria or goal is met. Step 806 may also include determining whether there are any remaining slice candidates in FS meeting the current slice selection criteria. Step 806 may evaluate to yes if the termination criteria/ion is met. Step 806 may evaluate to yes if there are no remaining candidate slices in FS meeting the slice selection criteria. If step 806 evaluates to yes, processing for the current FS stops. If step 806 evaluates to no, control proceeds to 808 where a candidate slice meeting the slice selection criteria is selected for cleaning to create free windows. At step 810, a partial window (e.g., including a mix of both free and consumed blocks) in the current slice is selected for cleaning. In step 812, the selected partial window is cleaned by invoking processing to evacuate or move data from the partial window to another target location in the file system whereby the partial window is then made a free window after completing the data evacuation or movement. At step 814, a determination is made as to whether there is any remaining partial window in the current slice. If step 814 evaluates to yes, control proceeds to step 810. If step 814 evaluates to no, control proceeds to step 806.

It should be noted that processing of 800 is shown as processing performed with respect to a single file system. As will be appreciated by those skilled in the art and consistent with description elsewhere herein, such processing may be performed, concurrently and/or sequentially, for more than one file system subject to any limits as also described herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of creating windows of free blocks in a file system comprising:
   selecting, in accordance with trigger conditions and using a processor, the file system;
   selecting, in accordance with slice selection criteria and using a processor, a first slice from a plurality of slices of storage provisioned for use by the file system;
   performing, using a processor, first processing on the first slice that creates at least one window of free blocks in the first slice for use by the file system; and
   determining, in accordance with termination criteria and using a processor, whether to process one or more additional slices of the file system to create additional windows of free blocks for use by the file system.

2. The method of claim 1, wherein said first processing includes:
   selecting a first window of blocks including at least one free block and a set of one or more consumed blocks, wherein said first window of blocks is included in the first slice of the file system; and
   relocating data stored in the set of one or more consumed blocks of the first window to a target location, wherein, after said relocating, the first window includes only free blocks.

3. The method of claim 1, wherein the trigger conditions include a number of slices provisioned for the file system is greater than a threshold number of slices, a percentage of free windows including only free blocks of the file system is less than a threshold percentage of free windows, and a percentage of relatively free slices of the file system is less than a threshold percentage of relatively free slices, wherein each of the relatively free slices includes at least a defined number or percentage of free blocks.

4. The method of claim 3, wherein the file system selected meets all the trigger conditions.

5. The method of claim 1, wherein first storage is provisioned for use by the file system from a logical device, said first storage including a plurality of slices, said plurality of slices including the first slice.

6. The method of claim 1, wherein the at least one window of free blocks is a set of blocks having contiguous logical addresses in an address space of a logical device.

7. The method of claim 1, wherein the termination criteria includes a first amount of free windows created by a current iteration of processing, a second amount of slices of the file system have been processed in a current iteration of processing, a third amount of free windows are found present in the file system, and whether there are any remaining candidate slices of the file system meeting the selection criteria.

8. The method of claim 7, wherein said determining includes determining not to process any additional slices of the file system if the first amount of free windows has been created in a current processing iteration of the file system.

9. The method of claim 7, wherein said determining includes determining not to process any additional slices of the file system if the second amount of slices of the file system have been processed in a current processing iteration of the file system.

10. The method of claim 7, wherein said determining includes determining not to process any additional slices of the file system if there are no remaining candidate slices of the file system meeting the selection criteria or if any resource consumption limit specified for creating free windows has been exceeded.

11. The method of claim 7, wherein said determining includes determining not to process any additional slices of the file system if the third amount of free windows are present in the file system.

12. The method of claim 1, wherein the slice selection criteria includes a first criterion where there is no allocation reference cursor positioned within a slice, said allocation reference cursor denoting a next block location from which storage is consumed by the file system in connection with servicing I/O operations for the file system.

13. The method of claim 12, wherein the slice selection criteria includes a second criterion where an amount of file system blocks consumed from a slice is below a threshold.

14. The method of claim 13, wherein the slice selection criteria includes a third criterion where a number of free windows including only free blocks in a slice is below a minimum threshold.

15. The method of claim 14, wherein the slice selection criteria includes a fourth criterion where there is at least one partial window of blocks in a slice, said partial window including at least a threshold number or percentage of consumed blocks including data that may be relocated.

16. The method of claim 15, wherein the plurality of slices are candidate slices of storage each meeting all of the criterion in the slice selection criteria.

17. A non-transitory computer readable medium comprising code stored thereon that, when executed, performs a method of creating windows of free blocks in a file system comprising:
- selecting, in accordance with trigger conditions, the file system;
- selecting, in accordance with slice selection criteria, a first slice from a plurality of slices of storage provisioned for use by the file system;
- performing first processing on the first slice that creates at least one window of free blocks in the first slice for use by the file system; and
- determining, in accordance with termination criteria, whether to process one or more additional slices of the file system to create additional windows of free blocks for use by the file system.

18. The non-transitory computer readable medium of claim 17, wherein said first processing includes:
- selecting a first window of blocks including at least one free block and a set of one or more consumed blocks, wherein said first window of blocks is included in the first slice of the file system; and
- relocating data stored in the set of one or more consumed blocks of the first window to a target location, wherein, after said relocating, the first window includes only free blocks.

19. The non-transitory computer readable medium of claim 17, wherein the trigger conditions include a number of slices provisioned for the file system is greater than a threshold number of slices, a percentage of free windows including only free blocks of the file system is less than a threshold percentage of free windows, and a percentage of relatively free slices of the file system is less than a threshold percentage of relatively free slices, wherein each of the relatively free slices includes at least a defined number or percentage of free blocks, and wherein the file system selected meets all the trigger conditions.

20. A system comprising:
- a processor; and
- a memory comprising code stored therein that, when executed, performs a method of creating windows of free blocks in a file system comprising:
  - selecting, in accordance with trigger conditions using the processor, the file system;
  - selecting, in accordance with slice selection criteria and using the processor, a first slice from a plurality of slices of storage provisioned for use by the file system;
  - performing, using the processor, first processing on the first slice that creates at least one window of free blocks in the first slice for use by the file system; and
  - determining, in accordance with termination criteria and using the processor, whether to process one or more additional slices of the file system to create additional windows of free blocks for use by the file system.

* * * * *